US005838928A

United States Patent [19]

Terashima

[11] Patent Number: 5,838,928
[45] Date of Patent: Nov. 17, 1998

[54] BACKGROUND COMMUNICATION SYSTEM HAVING I/O CONTROL BOARD AND LAN BOARD FITTED INTO A BUS EXPANSION SLOT SEPARATE FROM OTHER BUS EXPANSION SLOTS

[75] Inventor: Shigehiko Terashima, Kawasaki, Japan

[73] Assignee: Fujitsu Limited, Japan

[21] Appl. No.: 386,664

[22] Filed: Feb. 10, 1995

[30] Foreign Application Priority Data

Sep. 19, 1994 [JP] Japan .................................... 6-222874

[51] Int. Cl.[6] ............................ G06F 13/00; G06F 13/38

[52] U.S. Cl. ................................ 395/200.8; 395/200.42; 395/840

[58] Field of Search ......................... 395/200.01, 200.09, 395/200.02, 200.06, 840, 841, 200.3, 200.47, 200.48, 200.49, 200.55, 200.8, 847

[56] References Cited

U.S. PATENT DOCUMENTS 5,355,453 10/1994 Row et al. .............................. 395/200
5,359,715 10/1994 Heil et al. .............................. 395/325
5,394,526 2/1995 Crouse et al. .......................... 395/200
5,539,915 7/1996 Burton et al. ........................... 395/841
5,561,812 10/1996 Ravaux et al. .......................... 395/825
5,566,306 10/1996 Ishida ..................................... 395/309

*Primary Examiner*—Mark H. Rinehart
*Attorney, Agent, or Firm*—Staas & Halsey

[57] ABSTRACT

A background communication system is provided which is capable of transferring files in the background without the need to use a multithread OS. A LAN board and an external disk, which temporarily stores files received from a LAN and files to be transmitted to the LAN, are connected to a bus expansion slot of a personal computer, and this expansion slot is separate from that to which standard components for the personal computer are connected, whereby the LAN-related elements are separated in terms of hardware from the bus for controlling the personal computer. Network control means performs time-division multiplex control on the buses to permit background file transfer.

6 Claims, 4 Drawing Sheets

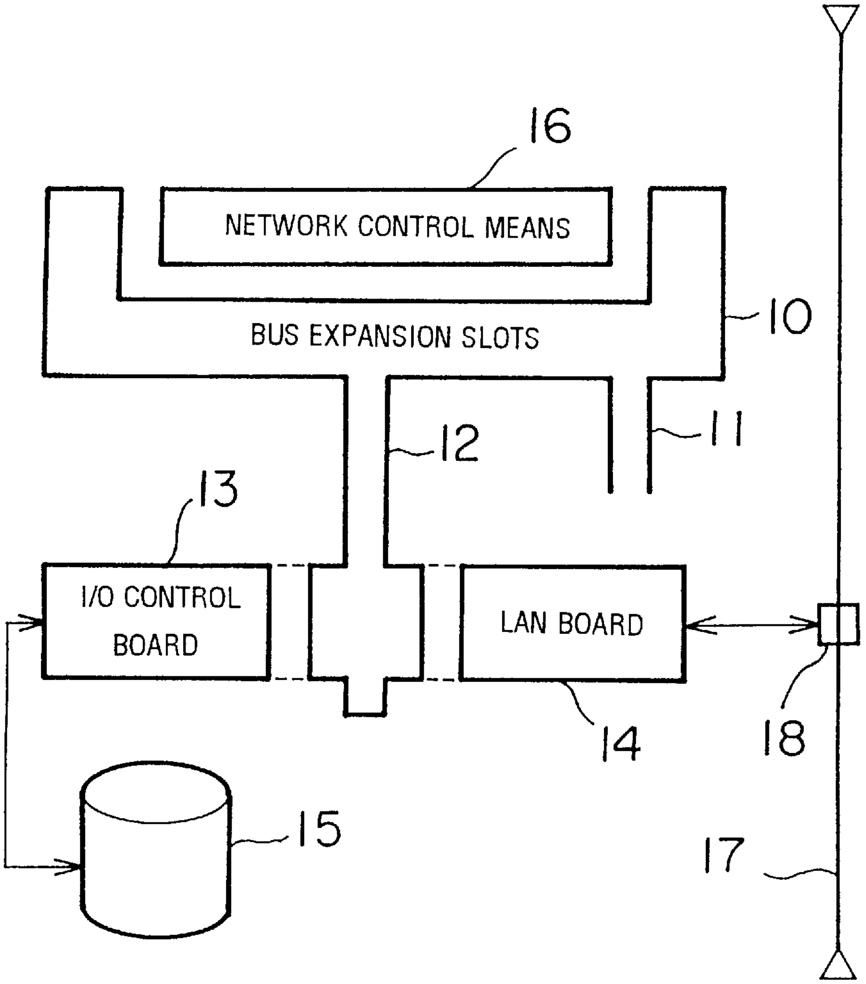
F I G. 1

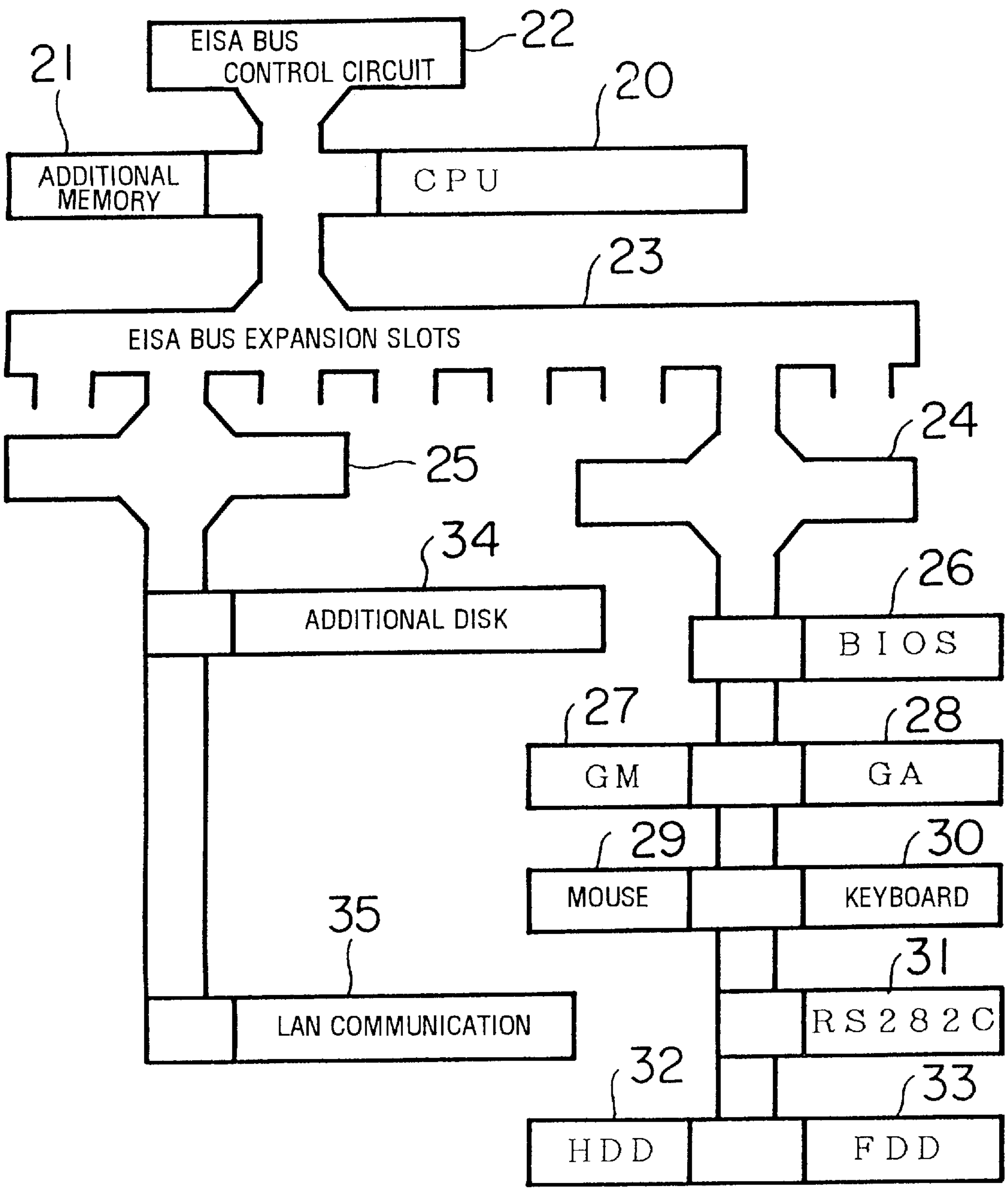
F I G. 2

BACKGROUND COMMUNICATION SYSTEM HAVING I/O CONTROL BOARD AND LAN BOARD FITTED INTO A BUS EXPANSION SLOT SEPARATE FROM OTHER BUS EXPANSION SLOTS

BACKGROUND OF THE INVENTION (1) Field of the Invention

The present invention relates to a background communication system, and more particularly, to a background communication system which permits personal computers connected to a network to communicate with one another in the background while tasks are performed by the personal computers.

(2) Description of the Related Art

Among conventional operating systems (OS) for computers, UNIX and OS/2 (trademark) that support multiuser, multitasking operation are known in particular. By using this type of multithread OS, it is possible to carry out two or more tasks simultaneously.

Another OS widely used in personal computers is MS-DOS (registered trademark) from Microsoft Corporation, which is a single-user, single-tasking OS designed for stand-alone personal computers. Also, MS-Windows (registered trademark), which operates on MS-DOS, supports single-tasking operation only; it is merely capable of pseudo-multitasking on screen. Thus, these systems do not support background communications according to transmission control procedures. Therefore, it is not possible to carry out a file transfer process in the background in parallel with another process.

In order to carry out file transfer according to a background communication procedure by using personal computers, a multithread OS, such as UNIX or OS/2 that supports multitasking, may be used to accomplish background communications. Generally, however, these OSs are expensive and also require costly software and hardware environments. Further, a problem arises in that some existing application softwares cannot be used.

SUMMARY OF THE INVENTION

An object of the present invention is to provide a background communication system which permits file transfer to be executed in the background in personal computers, without the need to use an expensive OS.

To achieve the above object, there is provided according to the present invention a background communication system for uploading and downloading files in background by using a personal computer having a plurality of bus expansion slots. The background. communication system comprises an additional external disk for storing files transmitted by background communication, an I/O control board for connecting the external disk to the personal computer, the I/O control board being fitted in a bus expansion slot separate from that to which a standard component for the personal computer is connected, a LAN board for connecting a LAN cable to the personal computer, the LAN board being fitted in the bus expansion slot to which the I/O control board is also connected, and network control means for controlling the bus expansion slots, the I/O control board and the LAN board.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 1 is a block diagram illustrating the principles of the present invention;

FIG. 2 is a diagram showing an example of arrangement of boards in relation to bus expansion slots;

DESCRIPTION OF THE PREFERRED EMBODIMENTS

Figure 3:
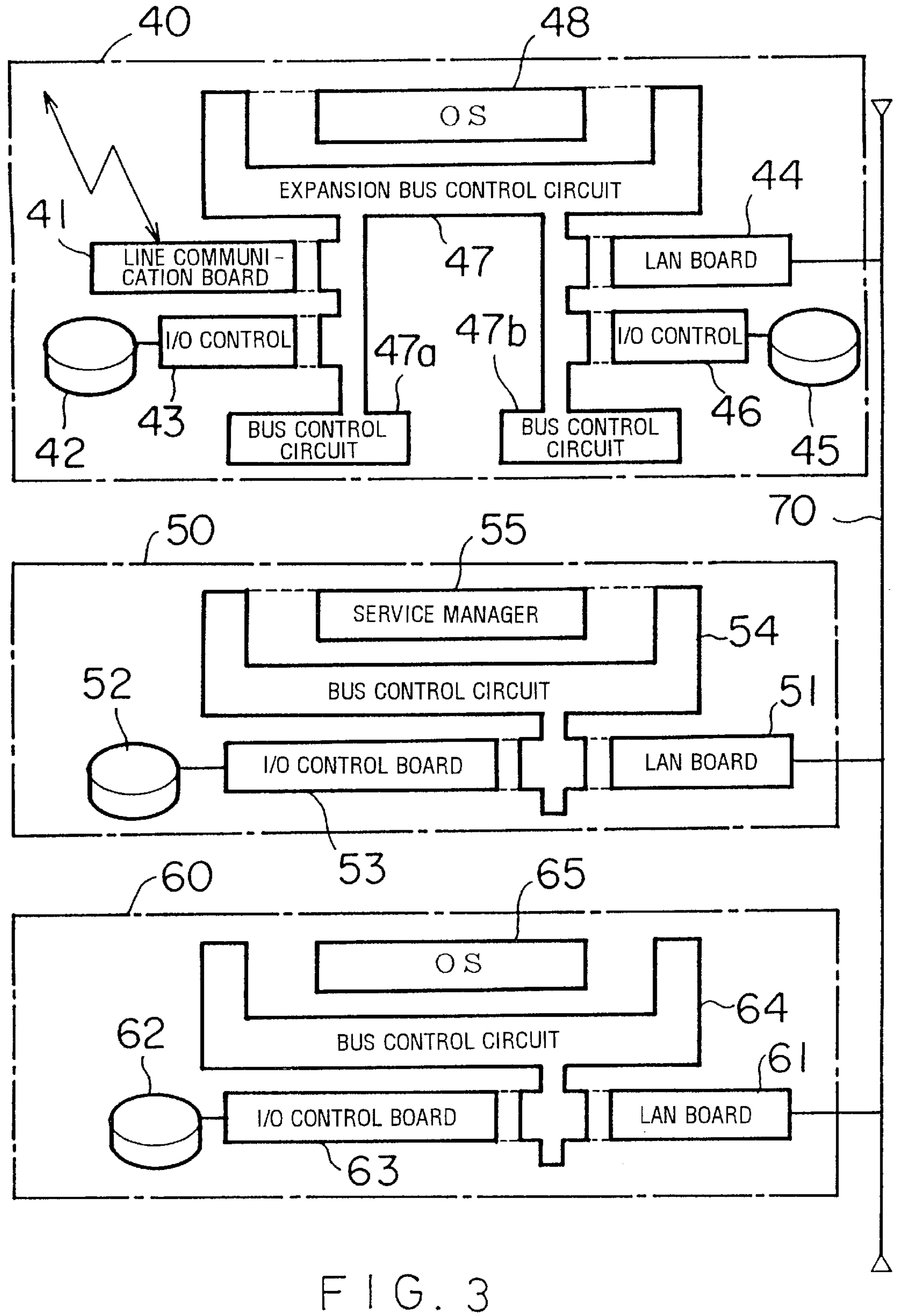
FIG. 3 is a diagram showing an example of configuration of a LAN connecting personal computers.

An embodiment according to the present invention will be described with reference to the drawings.

FIG. 1 is a block diagram illustrating the principles of the present invention. A background communication system according to the present invention utilizes bus expansion slots 10 which are provided in a personal computer to extend its capability. Among a plurality of bus expansion slots 10, a slot 11 is used for standard components associated with the personal computer. To a slot 12 separate from the slot 11 are connected an I/O control board 13 for disk control and a LAN (Local Area Network) board 14 for network control. The I/O control board 13 is connected to an additional external disk 15 for storing files to be transferred in the background, and the LAN board 14 is connected to a transceiver 18 linked to a LAN cable 17. Network control means 16 is further provided for controlling a file transfer process by means of the I/O control board 13 and the LAN board 14 via a network.

Thus, in this arrangement, the I/O control board 13 and the LAN board 14, both required for background communications, are connected to the slot 12 which is separate from the slot 11 used for the standard components associated with the personal computer, whereby the expansion boards required for the background communications are separated in terms of hardware or physically from the expansion boards for the standard components. The network control means 16 performs time-sharing control on the bus expansion slots 10 and also controls the I/O control board 13 and the LAN board 14 so that files can be uploaded and downloaded in the background via the network independently of application software processing by the computer.

FIG. 2 shows an example of an arrangement of the boards in relation to the bus expansion slots. In the illustrated example, a microprocessor 20 is connected to an additional memory 21, an EISA (Extended Industry Standard Architecture) bus control circuit 22, and EISA bus expansion slots 23. Two EISA bus expansion boards 24 and 25 are connected to respective two independent EISA bus expansion slots 23.

On the EISA bus expansion board 24 are integrated component parts relating to control of the personal computer, and all functions of the personal computer are accomplished via a bus extending from the board. Specifically, in this example, the EISA bus expansion board 24 is connected to a BIOS (Basic Input/Output System) 26 for controlling physical input/output devices, a graphics memory (GM) 27 for storing graphics data, a graphics accelerator (GA) 28 for improving the screen display speed, a mouse interface 29 connected to a mouse, a keyboard interface 30 connected to a keyboard, an RS-232-C interface 31 to which a communication device and the like are connected, an internal hard disk interface 32 to which an IDE (Integrated Device Electronics) hard disk, for example, is connected, and a floppy disk drive interface 33 connected to a floppy disk drive. Various processes inside the computer, such as entry of instructions and return of error messages, are all carried out via the single bus.

The other EISA bus expansion board 25 performs background communication-related control outside of the personal computer, and a bus thereof is connected to an additional disk interface 34 to which an external SCSI (Small Computer System Interface) hard disk, for example, is connected, and a LAN communication interface 35 connected to a network. Thus, the components associated with control of the background communications are separated physically or in terms of hardware from those associated with control of the personal computer.

Once the control over the two EISA bus expansion boards 24 and 25 connected to the EISA bus expansion slots 23 is transferred from the microprocessor 20, the EISA bus control circuit 22 performs time-division multiplex switching control on the two buses of the EISA bus expansion boards 24 and 25 as slaves.

FIG. 3 illustrates an example of a configuration of a LAN connecting personal computers. This LAN is composed of three types of personal computers. Specifically, the LAN comprises a single communication personal computer 40 used exclusively for communications with an external host computer, a single personal computer serving as a LAN server 50 for controlling shared files within the network, and a plurality of personal computers 60 used by a plurality of users.

The communication personal computer 40 will be outlined first. Two bus expansion slots of the communication personal computer 40 are used for LAN communications and for communications with the host computer, respectively. To the slot for communications with the host computer are connected a line communication board 41 linked to the host computer, and an I/O control board 43 connected to an external disk 42. A LAN board 44 connected to a LAN cable 70 and an I/O control board 46 connected to an external disk 45 are plugged in the LAN communication slot. Although the buses of these slots are generally controlled by an expansion bus control circuit 47, the bus of the slot associated with communications with the host computer is controlled particularly by a bus control circuit 47*a*, and the bus of the LAN communication slot is controlled particularly by a bus control circuit 47*b*. The communication personal computer 40 further includes an OS 48 for communications. The external disk 42 temporarily stores host-originated files downloaded from the host computer and host-destined files which are to be uploaded to the host computer, and the external disk 45 temporarily stores LAN-originated files received from the LAN cable 70 and LAN-destined files which are to be transmitted to the LAN cable 70.

In the LAN server 50, a LAN board 51 connected to the LAN cable 70 and an I/O control board 53 connected to an external disk 52 are plugged in a bus expansion, slot of the LAN server. The bus of this slot is controlled by a bus control circuit 54, and a service manager 55 functions as the OS. The external disk 52 is used as a shared disk for storing LAN server shared files. The LAN server 50 receives file transfer requests generated independently from the individual user personal computers 60 connected to the LAN cable 70, and exclusively performs queue management, message switching, and shared file management.

In the user personal computers 60, a LAN board 61 connected to the LAN cable 70 and an I/O control board 63 connected to an external disk 62 are plugged in a bus expansion slot of each computer. The bus of this slot is controlled by a bus control circuit 64, and an OS 65 administers the entire control of the user personal computer 60.

In this configuration, how a file is downloaded from the host computer to the user personal computer 60 will be explained.

A file transmitted from the host computer is first received by the line communication board 41 of the communication personal computer 40. The line communication board 41 continuously transfers the received file to the I/O control board 43 associated with the external disk 42. Namely, the bus control circuit 47*a* continuously transfers via the bus the file received by the line communication board 41, and the I/O control board 43 continuously receives the file from the line communication board 41. The received file is stored in the external disk 42. In this manner, the OS 48 of the communication personal computer transfers the file, received from the host computer, to the external disk 42.

Subsequently, in the communication personal computer 40, the host-originated file is copied to obtain a LAN-destined file to be transmitted to the LAN, and this is achieved by transferring the file stored in the external disk 42 via the expansion bus. First, the I/O control board 43 transfers the host-originated file in the external disk 42 to the bus control circuit 47*a*, which then transfers the file to the expansion bus control circuit 47. The expansion bus control circuit 47 transfers the file to the bus control circuit 47*b*, which in turn transfers the file to the I/O control board 46. The I/O control board 46 then transfers the file to the external disk 45 to be stored therein. In this manner, the OS 48 of the communication personal computer 40 copies the host- originated file from the external disk 42 to the other external disk 45, thereby preparing a LAN-destined file to be transmitted to the LAN.

Then, the service manager 55 of the LAN server 50 duplicates the LAN-destined file in the communication personal computer 40 to obtain a LAN server shared file in the LAN server 50. First, the LAN-destined file stored in the external disk 45 of the communication personal computer 40 is transferred to the I/O control board 46, which then transfers the file to the bus control circuit 47*b*. The bus control circuit 47*b* continuously transfers the file via the bus to the LAN board 44, which then sends the file to the LAN server 50 through the LAN cable 70. The file transmitted via the LAN cable 70 is received by the LAN board 51 of the LAN server 50, and is continuously transferred via the bus to the I/O control board 53 by the bus control circuit 54. The I/O control board 53 transfers the file to the external disk 52 to be stored therein as a LAN server shared file. In this manner, the service manager 55 of the LAN server 50 makes a copy of the LAN- destined file in the communication personal computer 40 via the LAN and stores the copy in the LAN server 50 as a LAN server shared file. Once the file is stored in the LAN server 50 as a shared file, it can be accessed for search and retrieval from a plurality of user personal computers 60 connected to the LAN to which the LAN server 50 is connected.

The shared file can be duplicated by any user personal computer 60 as a separate file as follows: First, the LAN server shared file stored in the external disk 52 of the LAN server 50 is transferred to the I/O control board 53, which then transfers the file to the bus control circuit 54. The bus control circuit 54 continuously transfers the file via the bus to the LAN board 51, which in turn sends the file to the user personal computer 60 through the LAN cable 70. The file transmitted via the LAN cable 70 is received by the LAN board 61 of the user personal computer 60, and is continuously transferred via the bus to the I/O control board 63 by the bus control circuit 64. The I/O control board 63 transfers the file to the external disk 62 to be stored therein. Thus, the OS 65 of any user personal computer 60 connected to the LAN can duplicate the LAN server shared file in the LAN server 50 via the LAN at any desired time as needed.

Now, how a file is uploaded from the user personal computer 60 to the host computer will be explained.

First, a user personal computer transfers a transmitting file so as to be copied as a LAN server shared file. Specifically, in the user personal computer 60, the transmitting file stored in the external disk 62 is transferred to the I/O control board 63, which then transfers the file to the bus control circuit 64. The bus control circuit 64 continuously transfers the file via the bus to the LAN board 61, which in turn sends the file to the LAN server 50 via the LAN cable 70. The file transmitted via the LAN cable 70 is received by the LAN board 51 of the LAN server 50, and then continuously transferred via the bus to the I/O control board 53 by the bus control circuit 54. The I/O control board 53 transfers the file to the external disk 52 to be stored therein. In this manner, the OS 65 of any user personal computer 60 can make a copy of the transmitting file therein and transfer the copy to the LAN server 50 as a LAN server shared file via the LAN at any desired time as needed.

Subsequently, the shared file in the LAN server 50 is copied to the communication personal computer 40 as a LAN-originated file. Specifically, the transmitting or host-destined file stored in the external disk 52 of the LAN server 50 is transferred to the I/O control board 53, which then transfers the file to the bus control circuit 54. The bus control circuit 54 continuously transfers the file via the bus to the LAN board 51, which in turn sends the file to the communication personal computer 40 via the LAN cable 70. The file transmitted via the LAN cable 70 is received by the LAN board 44 of the communication personal computer 40, and then continuously transferred via the bus to the I/O control board 46 by the bus control circuit 47*b*. The I/O control board 46 transfers the file to the external disk 45 to be stored therein. In this way, the service manager 55 of the LAN server 50 transfers a copy of a LAN server shared file to the communication personal computer 40 via the LAN.

The file thus transferred to the communication personal computer is duplicated to obtain a host-destined file, and this is achieved by transferring the file stored in the external disk 45 via the expansion buses. First, the I/O control board 46 transfers the file to the bus control circuit 47*b*, which then transfers the file to the expansion bus control circuit 47. The expansion bus control circuit 47 transfers the file to the bus control circuit 47*a*, which in turn transfers the file to the I/O control board 43. The I/O control board 43 transfers the file to the external disk 42, which then stores the file as a host-destined file. In this way, the OS of the communication personal computer 40 copies a file in the external disk 45, received via the LAN, to the other external disk 42 as a file destined for the host computer.

Finally, the communication personal computer 40 transmits the host-destined file. Specifically, the host- destined file in the external disk 42 is continuously transferred to the line communication board 41 by the I/O control board 43. Namely, the bus control circuit 47*a* continuously transfers the file from the I/O control board 43 via the bus, whereby the line communication board 41 continuously receives the file from the I/O control board 43. The line communication board 41 then transmits the received host-destined file via a line. In this manner, the OS of the communication personal computer 40 transmits a file stored in the external disk 42 to the host computer.

Figure 4:
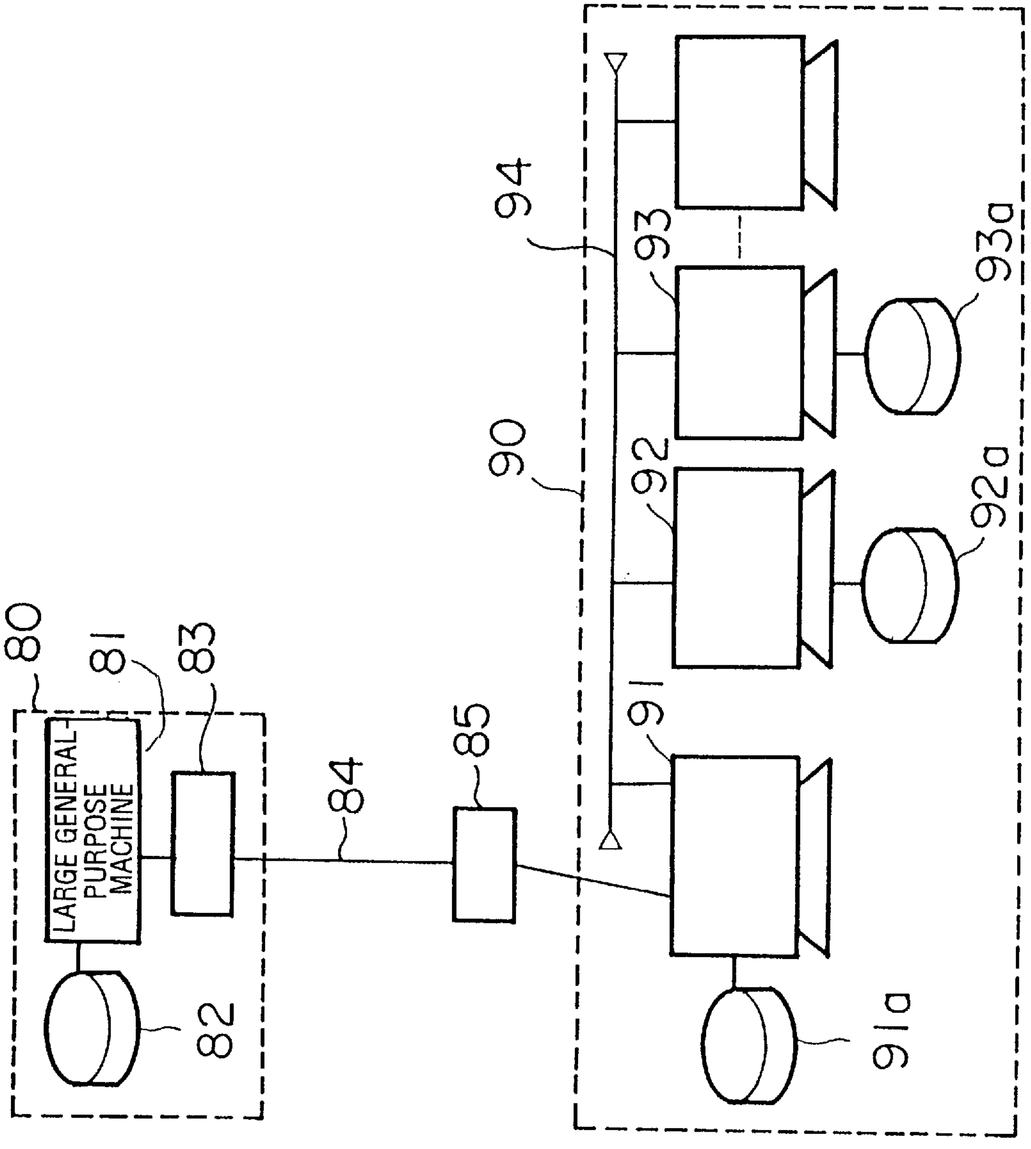
FIG. 4 is a diagram schematically showing the entire configuration of a background communication system according to the present invention.

FIG. 4 schematically illustrates the entire configuration of a background communication system according to the present invention. In the upper part of the figure, a computer center 80 is shown which manages data files to be transmitted in the background, and in the lower part of the same figure, an office 90 is shown in which user personal computers connected to a LAN are installed.

In the computer center 80 is installed a large general-purpose machine (host computer) 81 operating an on-line database system, and a magnetic disk 82 is connected to the large general-purpose machine 81. The magnetic disk 82 stores data in a format usable by the personal computers at the office 90. Data formats used in personal computers include non-indexed, sequentially organized data, or the so-called CSV (comma separated value) data. The large general-purpose machine 81 is also connected to a communication control unit 83. The communication control unit 83 is connected to a data transmission line 84 and controls exchange of data with respect to the data transmission line 84.

The data transmission line 84 extending from the computer center 80 is terminated at the office side by a terminal controller 85. The terminal controller 85 controls exchange of data at the user side, and is connected to a communication personal computer 91 in the office 90 by, for example, a coaxial cable.

In addition to the communication personal computer 91, a LAN server 92 which is a personal computer used exclusively for con trolling the network, and a plurality of user personal computers 93 are installed in the office 90, these computers being interconnected by a LAN cable 94. This LAN may be Ethernet.

The communication personal computer 91 is equipped with a line communication board connected to the coaxial cable extending from the terminal controller 85, and a LAN board connected to the LAN cable 94, and an additional external disk 91*a* for temporarily storing files transmitted by background communication is connected to the communication personal computer 91. The line communication board used may be a V.24 communication card, and the LAN board used may be, for example, an IPX/SPX board for NetWare which is a networking OS from Novell, Inc. In the communication personal computer 91 are installed communications software for controlling communications with the computer center 80, and LAN control software, for example, NetWare, in addition to an OS, for example, MS- DOS.

The LAN server 92 is equipped with an external disk 92*a* for storing shared files which are transmitted by means of background communications, and a LAN board connected to the LAN cable, such as an IPX/SPX board. LAN management software (service manager) for managing the shared disk and the LAN control software are installed in the LAN server 92.

Each of the user personal computers 93 is equipped with an external disk 93*a*, and a LAN board connected to the LAN cable, such as an IPX/SPX board. In each user personal computer 93 are installed the LAN control software, and software capable of handling the CSV format data, for example, database software, in addition to the OS.

In this configuration, when data is transmitted or downloaded from the computer center 80 to the office 90, for example, the large general-purpose machine 81 at the computer center 80, which is in wake-up mode and responds to a start request from the communication personal computer 91, reads out data from memory and sequentially transmits the data to the communication personal computer 91 according to an ordinary data link procedure, for example, SDLC (Synchronous Data Link Control) procedure, and the communication personal computer 91 stores the thus- transmitted data in the external disk 91*a* thereof.

Among a plurality of built-in EISA expansion bus slots of the communication personal computer 91, one slot is occupied by standard components for the personal computer and another slot is occupied by the line communication board and the I/O control board for the external disk. After the SDLC session is started, the telegraphic message, which is received in non-check mode, is written in the external disk connected to the same bus as the I/O control board, by using the time-slicing feature of the BIOS-MS-DOS. This is done in order to prevent the hang-up of MS-DOS which may occur when the LAN server 92 polls the communication personal computer 91 while the computer 91 is downloading a file in the background from the computer center 80. Also, in the communication personal computer 91, when the host-originated file is transferred as a LAN-destined file, hang-up of MS-DOS occurs if the telegraphic message is displayed at the display device of the communication personal computer 91. To avoid this, NetWare must be set in file transfer mode, to thereby transfer the file in the background in the so- called burst mode.

After the download of a file to the communication personal computer 91 is completed, the SDLC session is closed, and the communication personal computer 91 informs the LAN server 92 that it is activated.

The LAN server 92 receives, at a LAN board plugged in one of a plurality of built-in EISA bus expansion slots thereof, the file stored in the external disk 91*a* of the communication personal computer 91 via the LAN board and the LAN cable 94, and writes the file in the external disk 92*a* bus-connected to the same slot as the LAN board, by using the time-slicing feature of the BIOS-MS-DOS. The file written in this manner can be shared within the LAN. Since the standard components associated with the LAN server are connected to a slot. separate from that to which the LAN board and the external disk are connected, hand-up of MS-DOS never occurs while a transferred file is received via the LAN. The LAN server 92 performs queue management on download requests from the user personal computers 93.

As described above, according to the present invention, in a personal computer having a plurality of bus expansion slots, the I/O control board for an external disk and the LAN board connected to the LAN, both required for background communications, are fitted in a slot which is independent of and separated in terms of hardware from the slot to which standard components for the personal computer are connected, thus making it possible to carry out background file transfer in micro-mainframe link form. Accordingly, the additional external disk alone requires extra cost, and file transfer can be carried out in the background separately from the process executed in the personal computer, without the need to use a multithread OS such as UNIX or OS/2.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A background communication system for uploading and downloading files in background by using a personal computer having a processor and a plurality of bus expansion slots, comprising:

a single-tasking operating system running on the processor to execute a single real-time task;

a first bus expansion slot extended from the processor via a first bus expansion board, to which standard components for the personal computer are installed;

a second bus expansion slot extended from the processor through a second bus expansion board, to provide a bus connection separate from bus activities of the processor and said first bus expansion slot:

an additional external disk to store files transmitted by background communication;

an I/O control board to connect said external disk to the personal computer, said I/O control board being fitted in said second bus expansion slot;

a LAN board to connect a LAN cable to the personal computer, said LAN board being fitted in said second expansion slot together with said I/O control board, said second bus expansion slot allowing data to be transferred between said I/O control board and said LAN board during the uploading and downloading of the files in background, without interrupting operations of the processor working under said single-tasking operating system; and network control means for controlling said bus expansion slots, said I/O control board and said LAN board.

2. The background communication system according to claim 1, further including a plurality of personal computers each provided with said first and second bus expansion slots, said external disk, said I/O control board, said LAN board and said network control means, and wherein one of said plurality of personal computers is used as a LAN server.

3. The background communication system according to claim 2, wherein said LAN server receives file transfer requests generated independently and separately from the other personal computers connected to a LAN, and provides services in response to the file transfer requests.

4. The background communication system according to claim 2, wherein said external disk of said LAN server is used as a LAN server shared disk.

5. The background communication system according to claim 2, wherein another one of said plurality of personal computers is used exclusively as a communication personal computer, and said communication personal computer further includes a third bus expansion slot extended from the processor through a third bus expansion board, to provide a bus connection separate from activities of the processor and said first and second bus expansion slots, a second external disk to temporarily store files received from an external host computer and files to be transmitted to the host computer, a second I/O control board to connect said second external disk to the communication personal computer, said second I/O control board being fitted in said third bus expansion slot, a line communication board linked to the host computer via a data transmission line and fitted in said third bus expansion slot, and communication control means for controlling said second I/O control board and said line communication board which are fitted in said third bus expansion slot.

6. The background communication system according to claim 5, wherein said external disk of the communication personal computer stores files received from a LAN and files to be transmitted to the LAN.

* * * * *